Figure 1:
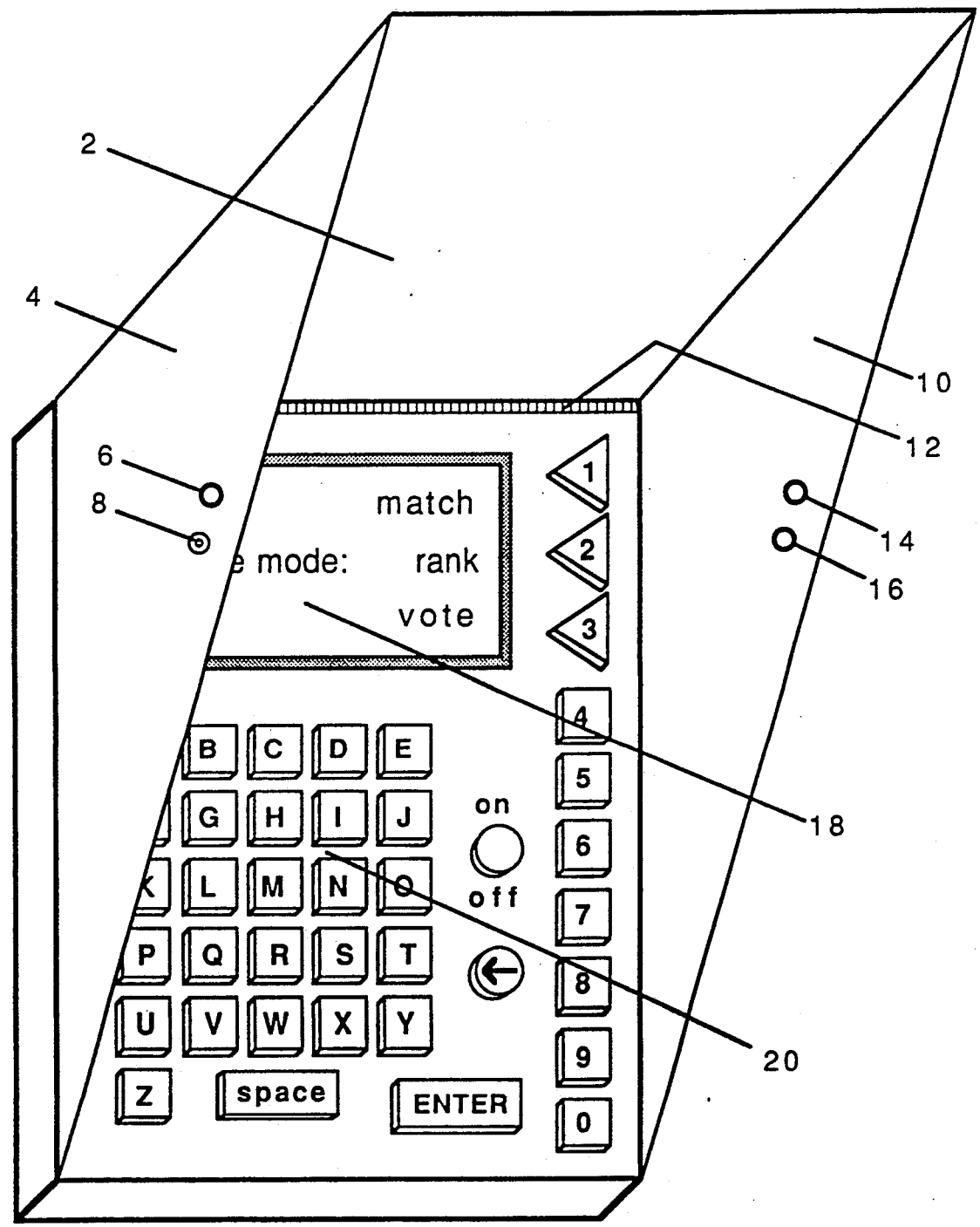

United States Patent [19]

Winkler

[11] Patent Number: 5,117,358
[45] Date of Patent: May 26, 1992

[54] ELECTRONIC TRUSTED PARTY

[76] Inventor: Peter M. Winkler, 1 Fairview Ave., Madison, N.J. 07940

[21] Appl. No.: 395,966

[22] Filed: Sep. 25, 1989

[51] Int. Cl.$^5$ .................... G06F 15/38; G06G 7/60
[52] U.S. Cl. ........................... 364/419; 364/410
[58] Field of Search .................. 364/419, 410, 411

[56] References Cited

U.S. PATENT DOCUMENTS

| | | | |
|---|---|---|---|
| 3,947,669 | 3/1976 | Simmons et al. | 235/156 |
| 4,333,090 | 6/1982 | Hirsh | 340/365 |
| 4,348,740 | 9/1982 | White | 364/900 |
| 4,348,744 | 9/1982 | White | 364/900 |
| 4,375,666 | 3/1983 | Buck et al. | 364/410 |
| 4,489,316 | 12/1984 | MacQuivey | 340/700 |

OTHER PUBLICATIONS

1986, Chaum, D., in *Proc. of CRYPTO '86*, Springer-Verlag, 195–199.
1987, Feige et al., in *Proc. 19th ACM Symp. Thy. Computing*, 210–217.
1985, Goldwasser et al., in *Proc. 17th ACM S. Thy. Computing*, 291–304.
1986, Goldreich et al., in *Proc. IEEE Foundations of CS*, 174–187.

*Primary Examiner*—Emanuel S. Kemeny
*Assistant Examiner*—Laura Brutman

[57] ABSTRACT

A portable electronic device for comparing and then destroying information, comprising a keyboard for input of information by two or more users, a microprocessor for comparing the information and then destroying it, and a visual display for revealing the results of the comparison; whereby each user may enjoy the results of the comparison and still be assured that his or her own information remains private, and cannot be extracted from the device either during use or at any later time.

In its preferred embodiment the device looks rather like a hand calculator with alphanumeric keyboard, but has a cover with a shield attached, permitting privacy in use of the keyboard.

Among the tasks which the device can perform are matching, that is, testing to see if two or more users have input identical information; ranking of users according to numerical input; and tallying of votes. Applications envisioned include password exchange, gossiping, secret ballot voting, boardroom polling, bidding, secret comparison, overcoming shyness, police interrogation and adult games.

17 Claims, 11 Drawing Sheets

ELECTRONIC TRUSTED PARTY

The Electronic Trusted Party is a portable electronic device which accepts information from two or more persons, compares or combines it in a preselected fashion, destroys the input information, then displays the results. The critical feature of the Electronic Trusted Party is that it is incapable of revealing information other than in certain agreed-upon ways. It thus functions as a limited-access computing device, whose special features enable users to trust it with private information.

Background

Suppose two persons suspect that they have the same person in mind to nominate for some post, or invite for dinner, or blame for a disaster, etc. However, neither is willing to risk embarrassment by revealing the name, in case they are mistaken. Normally, this is an occasion for delicate conversational probing, which may or may not succeed. Heretofore the only alternative has been to find a "trusted party," that is, someone who both parties can trust to be discrete; such a person is usually either unavailable or expensive.

Similarly, it often happens that two persons have each been enjoined from spreading a certain piece of information, but could potentially benefit by discussing the information—provided each can safely determine that the other has already been given the information. Up until now, such parties were unable to communicate unless they could find someone who knows that both parties have been informed.

As a special case of the above, two persons may each wish to determine whether the other is in possession of a particular password. The danger is that if A states the password, in order to convince B of his authenticity, and B is an impostor, then B may later be able to make illicit use of the password. Since a trusted party is virtually never available in this case, the solution heretofore has been to substitute an entire dialog; then if B is an impostor he/she learns at most the opening line to the dialog. Clearly, the method is imperfect since (1) some illicit information is passed, (2) memorization may be strained, and (3) valuable time may be lost.

In formal decision-making, unwillingness to share information can lead to awkwardness. Secret ballots, for example, often work badly because (1) one person gets to read the ballots, and may be able to determine their sources; or (2) enough votes are predictable so that the remainder may be determinable from the vote tally. Both problems are obviated if a trusted party is present; he/she can, for example, announce the winner or winners of an election (or the names of candidates involved in a run-off) without revealing the tally. But rarely is such a person available.

All the above situations have the following features in common: two or more persons can potentially benefit by pooling information, but are unwilling to have the information exposed. In each case the problem disappears in the presence of a trusted party; and in each case the problem is solved easily by the Electronic Trusted Party.

Still more uses will be discussed below under "Objects and Advantages."

Use of the Electronic Trusted Party is absurdly simple. When turned on the device asks for mode selection, that is, whether it is to be used for matching, ranking, or voting, and what sort of output is required. It then asks for the number of participants. Each participant privately enters his or her input; the Electronic Trusted Party then makes the necessary computations or comparisons, destroys the input information, and displays the results.

PRIOR ART

No device, electronic or otherwise, is currently known which is designed to serve as a trusted party in all of the situations given above. Relevant prior art falls into two categories, both considered below: (1) general-purpose computing machines; and (2) devices and mathematical algorithms designed to solve (by different means than ours) special cases of the above problems.

The computational requirements of a trusted party are easily met by a programmable computer or calculator (as will, in fact, be demonstrated later). For the tasks considered here, a "trusted party", human or otherwise, need not perform any task requiring specifically human intelligence. However, there is a critical requirement that all other participants must be able to rely on the trusted party to keep its mouth shut.

Alas, it has hitherto been no easier to find a computing device which will keep its mouth shut than a human; computers and calculators are designed to be able to display any information, upon appropriate request, which has been input to them. A programmable device can be set up to mimic the behavior of an electronic trusted party, but the very nature of its programmability makes it unacceptable for actual use.

For example, in the password exchange problem described above, suppose that B produces a programmable calculator and says to A: "Type in the password while I'm not looking. The program will erase your word from the display. Then I will type in the password, while you look away. The program will indicate whether or not the two words are the same."

"No good," replies A. "If you're an impostor, you'll just extract my word later from your calculator."

"I can't do that," says B. "The program blanks the words as soon as they are compared."

"But," says A, "how do I know you won't run off with the calculator as soon as I've finished typing in the password?"

"I still won't be able to get your word out," claims B. "The program uses cryptographic techniques to hide all things input to it."

"And how," replies A, "am I supposed to know that your program does all this? I'd as soon say the password out loud as type it into your calculator!"

The point is that a multi-purpose computing device cannot be trusted any more than the person who programs it. (Later we give an example of a "bogus" trusted party program, which encrypts and hides input data in the program itself, where it can be recovered by the programmer.)

It should be pointed out that general-purpose computing machines have additional disadvantages relative to the proposed devices: they are not designed for shielded input; they have inappropriate keyboards (either too many keys or too few); and they are more complex and more expensive to make. In contrast, the Electronic Trusted Party is simple, cheap, easy to use, and trustworthy.

We now proceed to discuss prior art which addresses one or another of the specific problems (matching, voting, authentication) mentioned above.

Of numerous devices for matching and comparing data, the one which comes closest to the Electronic Trusted Party (being, for example, electronic and portable) is described in U.S. Pat. Nos. 4,348,740 and 4,348,744, of Sep. 7, 1982. Both are by Edward A. White and are entitled "Method and Portable Apparatus for Comparison of Stored Sets of Data." The device described therein is actually a pair of processors with numeric keyboards; two persons can enter personal information (e.g. numerical answers to a personality test) and the machines will compare data, then "compute a score representing the degree of compatibility of the two persons." It differs from the Electronic Trusted Party in having two parts and not providing alphabetic entry, but most importantly, it does not destroy input data; nor would it have any need to, since its purpose is quite different from ours. Thus, White's device could not be used to solve even this one problem (matching) addressed by the Electronic Trusted Party.

Machines for secret-ballot voting are of course in common use in public elections, but no portable device with the Electronic Trusted Party's "boardroom" capabilities has come to our attention. Coming closest among patented devices are U.S. Pat. Nos. 3,947,669 (Mar. 30, 1976) and 4,489,316 (Dec. 18, 1984). The first is by William W. Simmons and James A. Marquis, entitled "Voting Machine"; it uses digital circuitry to enable voters to select an alternative and express a degree of confidence in their selection. However, it does not conceal or destroy information other than the identities of the voters; in fact one of its objects is to display additional information about the tally not provided by prior art. Thus it cannot be substituted for an Electronic Trusted Party even in this one function.

The second patent does have a certain "masking" aspect. Invented by Donald R. MacQuivey and entitled "Method and Apparatus for Minority View Reduction," it is designed to encourage expression of minority views by enabling anonymous expression of approval or disapproval at a meeting. The method, however, is subtle switch-pressing or jaw-sensitive electronic device. Thus, although its purpose is vaguely similar to ours, its approach and effect are entirely different.

The "masking" aspect of the Electronic Trusted Party, with respect only to data entry, is found also in U.S. Pat. No. 4,333,090 (May 5, 1980) by Steven B. Hirsh. Hirsh's "Secure Keyboard Input Terminal" uses codes to prevent anyone not directly above a keyboard from observing entered data. Such a device could conceivably be used in combination with the Electronic Trusted Party to assure secure input, although in the preferred embodiment of the latter, only a simple physical shield is employed.

Among games, the closest thing we could find to "prior art" is described in U.S. Pat. No. 4,375,666 (Mar. 1, 1983) by Gordon H. Buck, Scott A. Ferdinand, and George J. Klose, for Mattel Inc. Their "Electronic Guessing Game" involves a microprocessor and enables one player to try to guess a secret number entered by another, but any resemblance to the purpose or mechanics of the Electronic Trusted Party ends there.

Clearly, none of the above-mentioned devices is directed at all to the general purpose of the Electronic Trusted Party, that is, to replace a human's function of enabling parties to communicate without revealing private information. Oddly, a closer approximation to the purpose of our device is achieved by certain sophisticated mathematical algorithms.

In recent years there has been some theoretical work published concerning a mathematical construct known as a "zero-knowledge proof," the object of which is to enable A to convince B that A possesses certain knowledge, without actually passing that knowledge to B. Most relevant are the following papers:

Chaum, D., "Demonstrating That a Public Predicate can be Satisfied Without Revealing Any Information About How," *Proceedings of CRYPTO* 1986, SpringerVerlag, Berlin, pp. 195-199.

Feige, U., A. Fiat and A. Shamir, "Zero Knowledge Proofs of Identity," *Proc. 19th Annual ACM Symposium on the Theory of Computing*, 1987, pp. 210-217.

Goldwasser, S., S. Micali and C. Rackoff, "Knowledge Complexity of Interactive Proof Systems," *Proc. 17th Annual ACM Symposium on the Theory of Computing*, 1985, pp. 291-304.

Goldreich, O., S. Micali and A. Wigderson, "Proofs that Yield Nothing But their Validity and a Methodology of Cryptographic Protocol Design," *Proc. IEEE Conference on the Foundations of Computer Science*, 1986, pp. 174-187.

In principle, the methods described in these articles might be used by persons involved in a password exchange, provided each has brought his own computer and is suitably instructed in the relevant techniques (borrowed, for the most part, from public-key cryptography). However, use of this technique is absurdly impractical in everyday life. Moreover, it has theoretical shortcomings as well: e.g. the degree of "convincing" is probabilistic in nature; and so-called "trapdoor functions," which have not yet been shown to exist, are required in order to guarantee computational security.

In any case our simple, cheap and practical device can serve as trusted party in the many situations indicated above and below. Nothing in the prior art approaches its simplicity and versatility.

OBJECTS AND ADVANTAGES

Here are some of the situations in which the Electronic Trusted Party could be useful or even essential.

Password exchange: any number of parties can confirm that each is in possession of a common password, without any having to fear that his or her password will be revealed to an impostor.

Gossiping: two or more parties may determine whether they have heard the same rumor. If so, they can discuss it; if not, it needn't be spread. As an historical note, it is this application which first suggested the need for an Electronic Trusted Party to the inventor. On Apr. 8, 1987, he had a conversation with a colleague in which (as later became apparent) each suspected that the other was also aware of a certain friend's dalliance. Since no one wished to risk starting a rumor, an enjoyable dialog was passed up.

Secret ballot voting: the winner, winners, or run-off participants resulting from an election can be determined and displayed, while the exact count is (if desired) destroyed. The result is a much more "secret" ballot than is obtainable in a small election, where typically voters can make inferences about votes from the tally.

Boardroom polling: similarly, executives can be polled concerning the advisability of some course of action. If a majority agree, the outcome will be the same as if there were unanimity; thus no one need be afraid of distinguishing himself or herself as a renegade. Strong leaders often need to know what their advisors really think, in the absence of "fear of dissention." Perhaps the Electronic Trusted Party could have saved ex-President Reagan the embarrassment of the Iran-Contra affair.

Bidding: contractors may submit bids on the Electronic Trusted Party, and (if desired) only the identity of the lowest bidder revealed, the values of the bids themselves having been destroyed.

Secret comparison: a group of friends may wish to determine who among them has the greatest net worth, or has had the most lovers, or has the "extreme value" of any potentially embarrassing parameter. With the Electronic Trusted Party they may identify the person with the highest or lowest value, or even obtain an ordering of all participants by this parameter, without revealing to anyone an actual number.

Overcoming shyness: two persons have a certain desirable course of action before them, but for one reason or another, neither wishes to be the first to suggest it.

Police interrogation: Police suspect person A of masterminding a certain crime and have captured underling B. They have offered B immunity for incriminating A, but B is afraid to name A unless he can be assured that the police already suspect A. The police are hamstrung because if they suggest A's name to B, B's statement won't hold up in court. Enter the Electronic Trusted Party!

Adult games: the inventor's experience suggests that many people are afraid to play games such as Scruples ® in which they might have to reveal personal facts about themselves. Games can be designed around the Electronic Trusted Party which no one need be afraid to play, but which reveal entertaining information about a group.

For example, the inventor suggests a game which he calls AYTWIT ("Are You Thinking What I'm Thinking?") which uses the Electronic Trusted Party's "match" mode to uncover secret knowledge links between players. For each pair A,B of player, player A asks a question of the whole group to which he or she thinks B will give the same answer as A, but others will disagree. Of course, players enter their answers into the Electronic Trusted Party. If A and B do agree then A wins a point for every other player who does not agree, with a bonus when no other player agrees.

Adult games, in the inventor's opinion, may be one of the most promising of the applications from a commercial point of view. It will be clear that an Electronic Trusted Party can be manufactured for far less than the selling price of a typical board game, and its inclusion in a game would be a unique selling point.

Once samples of the Electronic Trusted Party fall into consumer's hands, many more uses will doubtless be found.

GENERAL DESCRIPTION AND METHOD OF OPERATION

In its preferred embodiment, the Electronic Trusted Party, henceforth referred to as "ETP", looks like a battery-operated hand calculator with alphanumeric keyboard and specially designed cover. When opened, the cover extends side panels which shield the keyboard, helping a user to keep others from seeing what keys he/she presses or what is currently shown in the display.

When turned on, ETP displays a menu of possible modes. Its users select a mode, namely "match," "rank" or "vote," by depressing the appropriate key. ETP then asks for the number of inputs expected (a digit 2 through 9).

If "rank" or "vote" mode has been selected, ETP asks for additional information concerning output. Options for "rank" are "full ranking," "highest only" and "lowest only"; for "vote" they are "full tally," "win/runoff" and "winners only." The mode and output option will be shown at the top of the display area throughout the input phase, so that no participant can be misled.

ETP is now passed around so that each user may make his or her input. The input could be a word; a phrase; a numerical quantity; or a number which denotes one of the possibilities, or candidates, on an agreed-upon list of alternatives. Whatever is input appears temporarily on the display and can be corrected, using a backspace key, if necessary. When a given user's input is complete he or she presses the "ENTER" key; the input then disappears from the display and can no longer be retrieved by anyone.

When ETP has absorbed all the inputs it "expected" to receive, it computes the result and displays it, with an accompanying sound. (The sound prevents a player from surreptitiously completing a game and beginning a new one when it is his/her turn to input information.)

If ETP is in "match" mode and detects a match, it will beep a victory tune and display the word "match." When there are more than two players, it will indicate which ones agree by grouping the player numbers whose inputs match: i.e. "{2 3 6} {1 8}" means that the second, third and sixth inputs were identical, that the first and eighth were identical but different from the other three, and that the input of each remaining player was unique.

If there is no match ETP will buzz and so indicate.

In ranking mode ETP will beep twice and indicate the number of the player whose input value was highest; or lowest; or give a complete ranking from highest to lowest, according to previous request.

In voting mode output is accompanied by three beeps. The "winners only" option results in output of the winner or winners; in "winner/runoff," ETP will indicate the winner only if he/she has won a majority, otherwise indicating the candidates for whom a run-off vote is required. In "full tally" mode the number of votes cast for each candidate is given, but as in all cases the identities of the voters are forever lost.

In every case ETP's RAM memory is blanked as soon as the necessary computations have been made. The memory is also blanked when the battery case is opened, when a mechanical shock is detected, when any unexpected electronic signal is received, and of course when the device is turned off; and in each case there is an accompanying beep.

PHYSICAL DESCRIPTION

The Electronic Trusted Party, in its preferred embodiment, is displayed in open position in FIG. 1. The base, containing an LCD display [18] and alphanumeric keyboard [20], is described in detail below. A rigid plastic cover [2] is attached to the upper edge of the base by a hinge [12]. Two opaque, triangular panels of flexible material [4], [10] are attached to the sides of the base and cover. Affixed to the panels are three open grommets [6], [14] and [16] and the female part of a snap closure [8].

Figure 2:
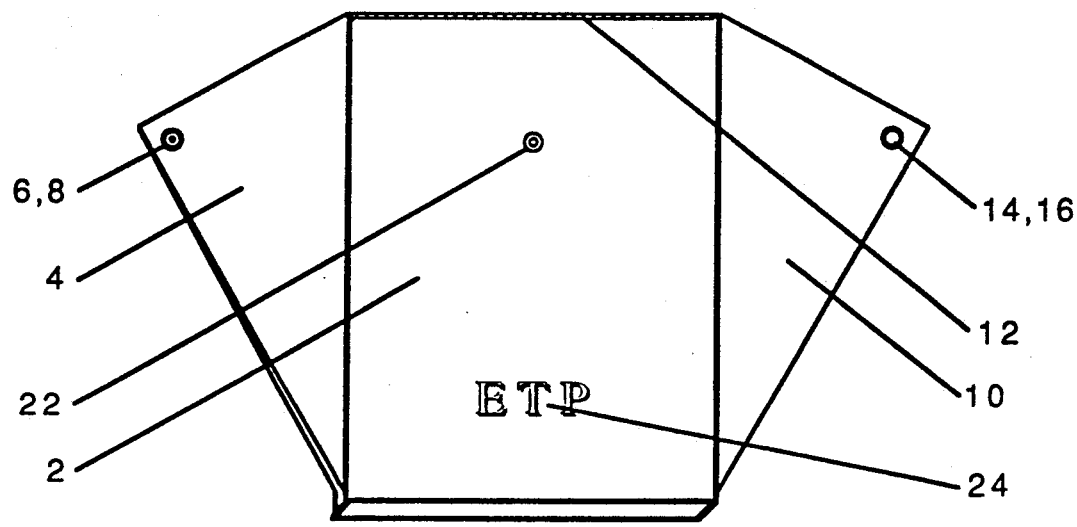

FIG. 2 shows what ETP looks like after the plastic cover has been lowered. The panels [4], [10] fold so that the snap [8] appears through a grommet [6] on the left panel, and the two grommets [14], [16] on the right panel line up. On the upper surface of the cover [2] one sees the hinge [12], an insignia [24] and the male part [22] of the snap.

Figure 3:
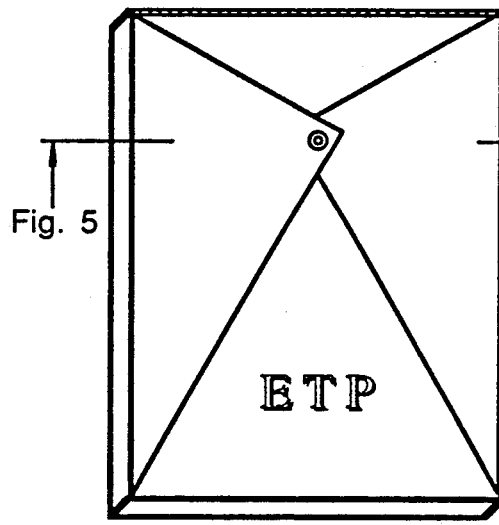
Figure 4:
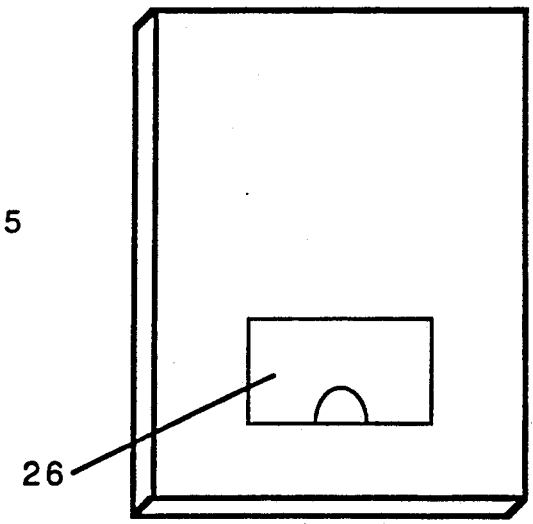

FIG. 3 shows ETP with the right and left panels folded down onto the cover and snapped in place, forming a secure compact unit;

The reverse side is shown in FIG. 4 with battery cover [26].

Figure 5:

FIG. 5 shows a cross-section through the snap.

Figure 6:
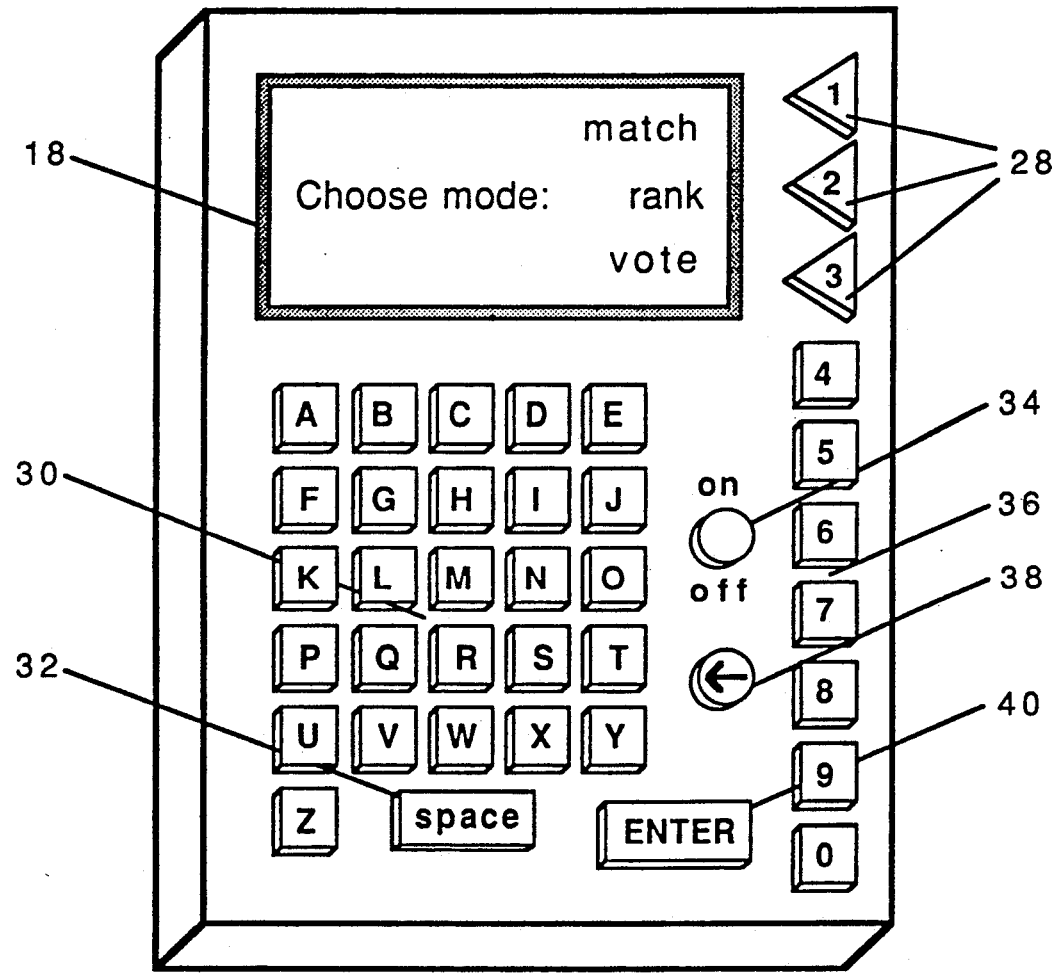

FIG. 6 shows the keyboard with cover and panels removed. At the top is the LCD display [18] which provides three lines of characters. Below the display are 26 alphabet keys [30], upper case only, and a space bar [32]. On the right are number keys [36], of which the first three [28] are positioned opposite the three lines of the display [18] so that they can function also as mode selectors. An on-off button [34] alternately turns on or shuts off the device below it is a backspace key [38] and the very important ENTER key [40] used to signal the end of entered data.

Figure 7:
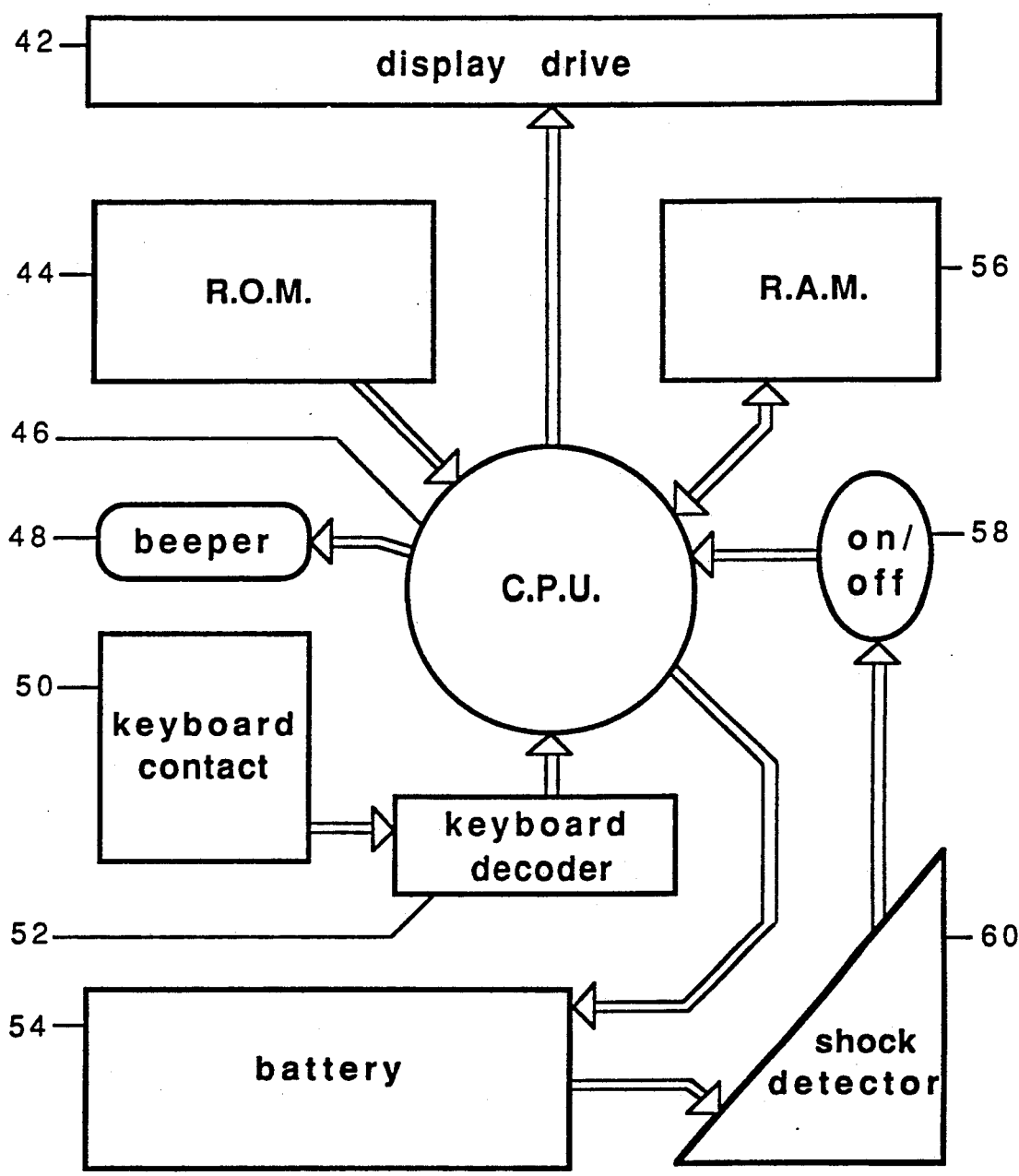

A schematic diagram of the electronic parts internal to ETP's base is given in FIG. 7. At the center is a Central Processing Unit [46] which, in view of ETP's modest computing requirements, could be among the simplest and least expensive chips available. The C.P.U. [46] is attached to the battery [54], which is in turn connected to a shock detector [60]; the shock detector will interrupt the flow of electricity, thereby blanking the Random Access Memory [56], whenever the shock detector [60] detects either a mechanical blow or an abnormal pattern in the electrical current. A line from the shock detector [60] to the on/off switch [58] and back to the C.P.U. [46] completes the circuit. Attached to the C.P.U. [46] are a display drive [42], which operates the 3-line LCD display; a Read Only Memory [44] containing ETP's program (detailed below); a Random Access Memory [56] which stores, very temporarily, input data; and a beeper [48]. A keyboard contact [50] sends its signals to a decoder [52] which then passes them to the C.P.U. [46].

ALGORITHMIC DESCRIPTION

The novelty of ETP lies primarily inside its Read Only Memory, where the program which drives the device is found. We indicate this program (in its preferred embodiment) in two ways, by means of a flow chart and by a program listing. The program listing is exact, since it is a working program, but is necessarily difficult to read and language-specific (in this case, written for the Hewlett-Packard HP-28S calculator). Thus the flow chart would likely be the easier means for one skilled in the art to actually build a chip. However, it should be noted that this is a relatively easy program to implement, comparable to that of a four-function calculator or a five-function digital wristwatch, and far simpler than what is routinely coded into Read Only Memories as of this writing.

Figure 8:
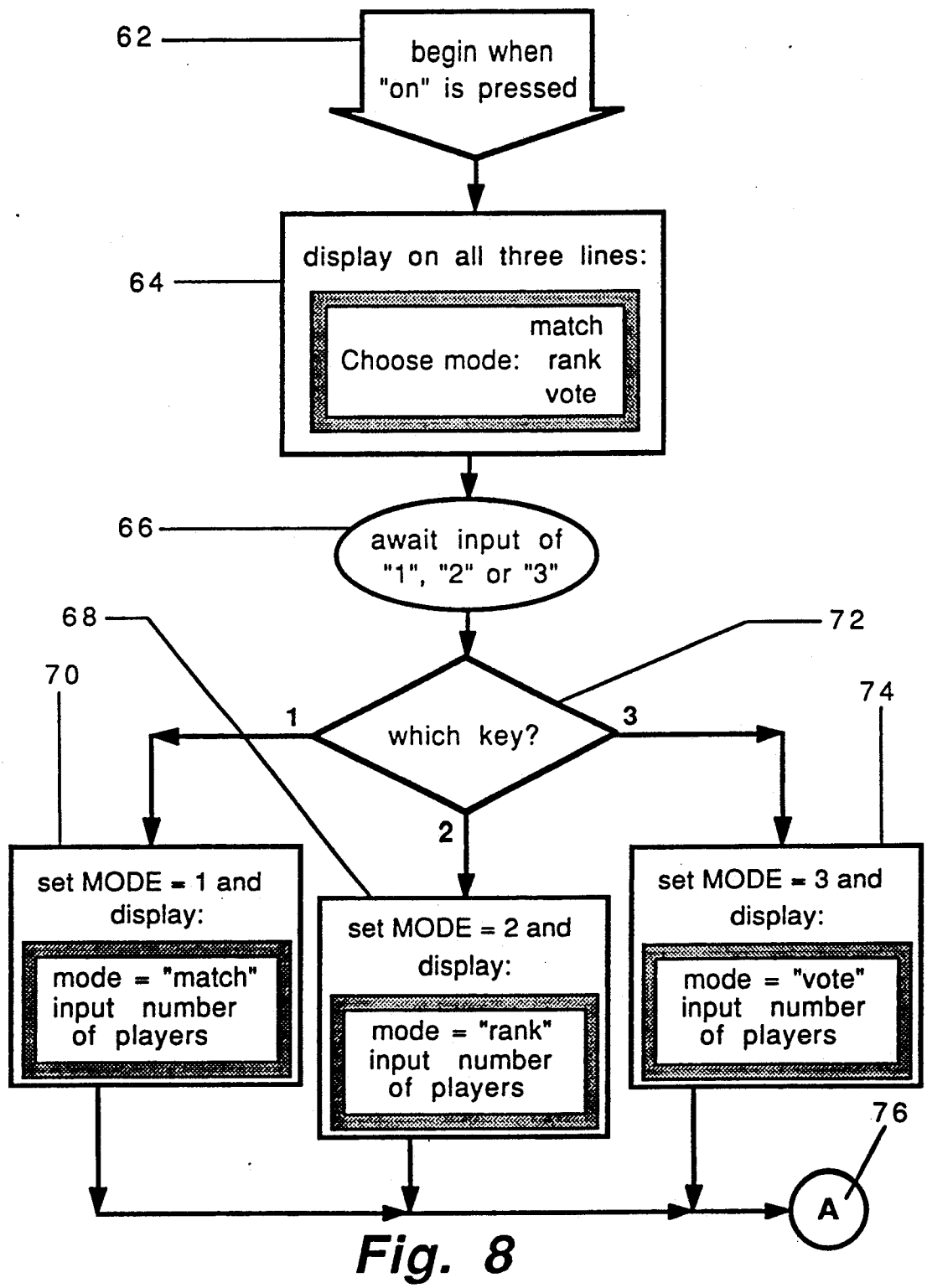

The flowchart occupies FIGS. 8 through 14. Referring to FIG. 8, the program begins when "on" is pressed [62]; ETP reacts by displaying its mode menu [64]. ETP then waits [66] for a mode to be selected by pressing one of the buttons alongside the display (all other inputs are ignored). On the basis of which key is pressed [72], the "match" mode [70], "rank" mode [68] or "vote" mode [74] is set and so indicated on the display, while the number of players is requested. The flow now proceeds via point A [76] to FIG. 9.

Figure 9:
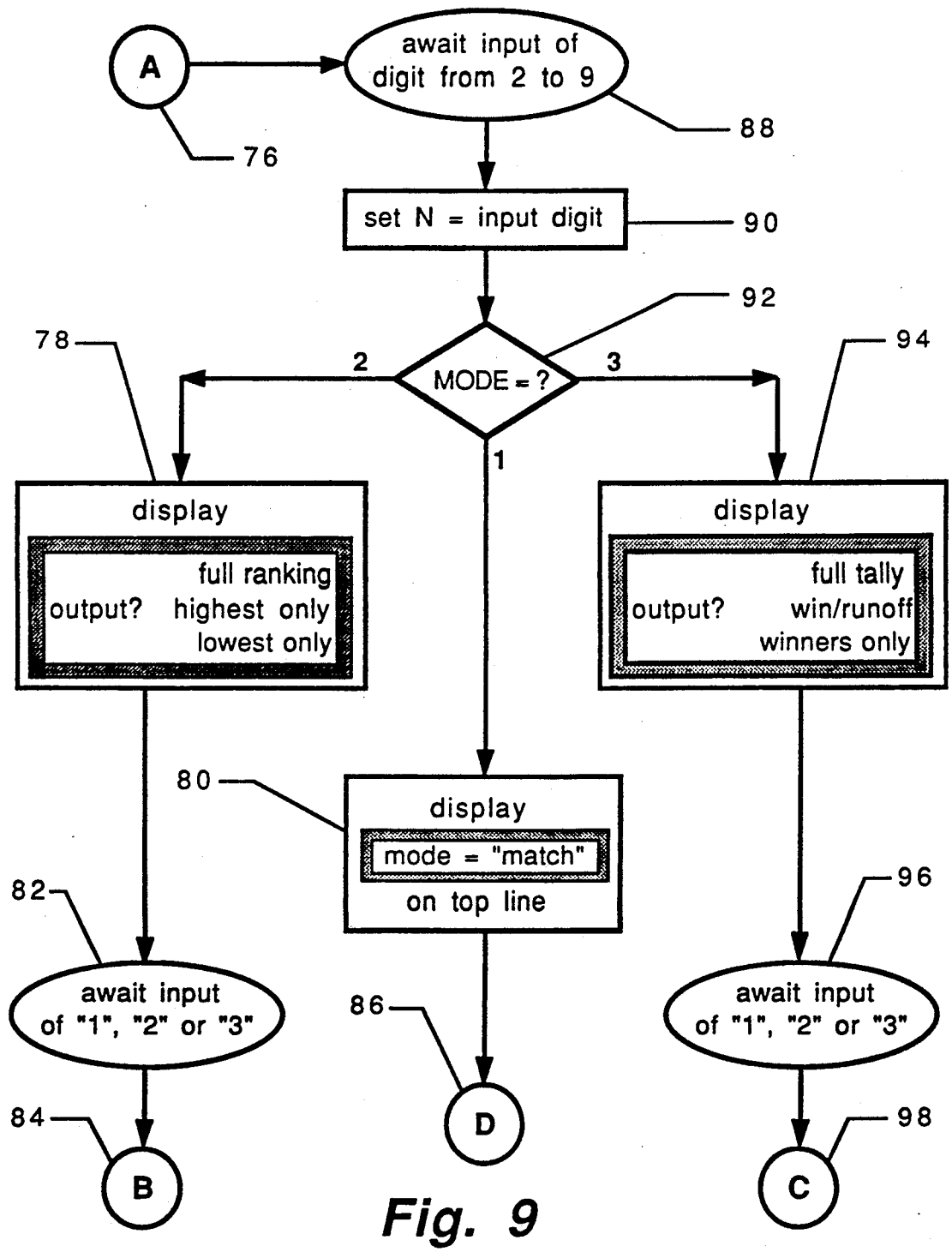

At the top of FIG. 9 the program begins at point A [76] and awaits an input digit [88] representing the number of players. The digit is stored in variable N [90] and the MODE flag is checked [92]. If MODE=1 the program merely displays a reminder on the top line of the display that it is in "match" mode [80], then proceeds to point D [86] which picks up in FIG. 11. If MODE=2, ETP asks [78] for output type, awaits the answer [82] and proceeds to point B [84]; if MODE=3 the response is similar, asking for type of "vote" output [94] and waiting [96] before proceeding to point C [98].

Figure 10:
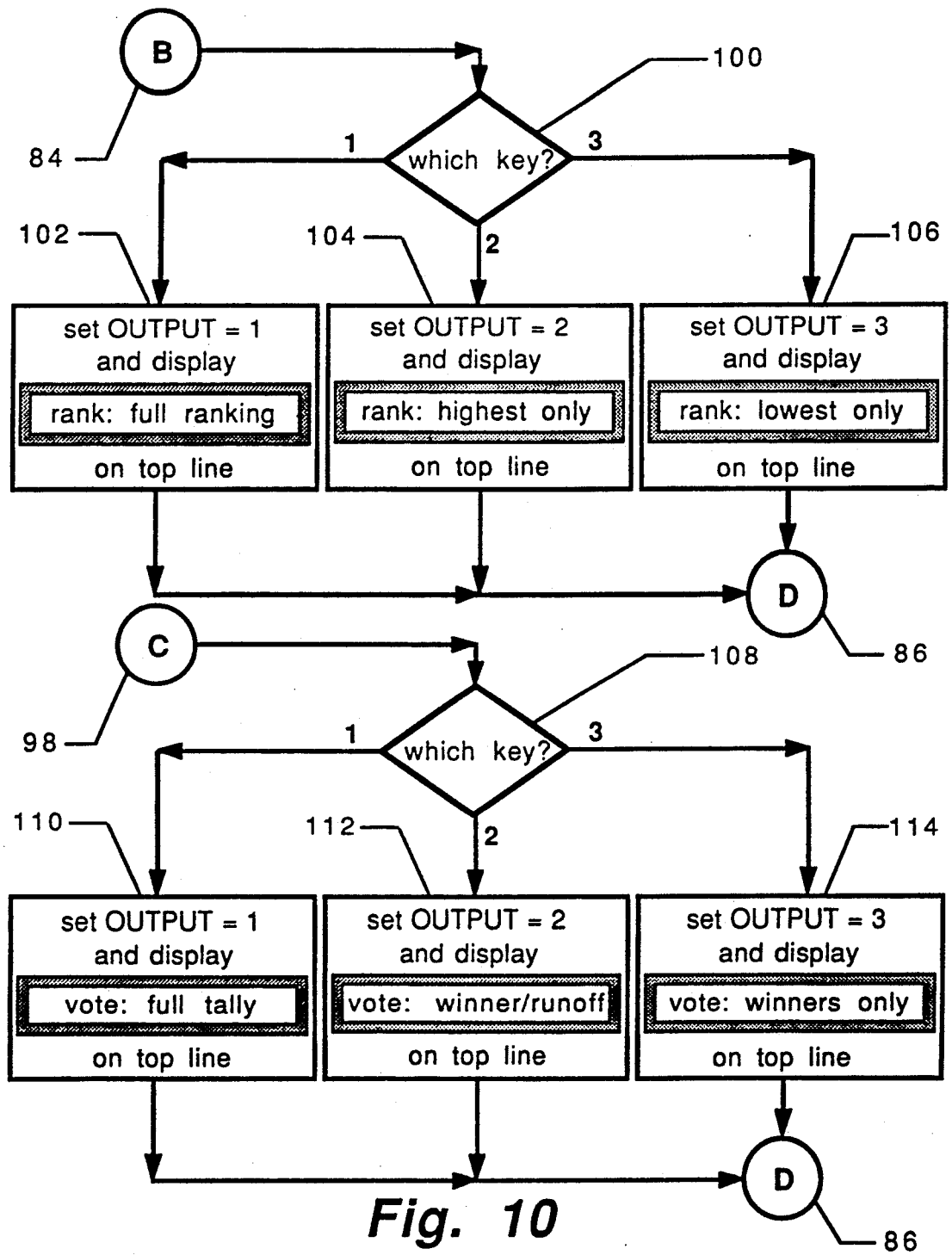
Figure 11:
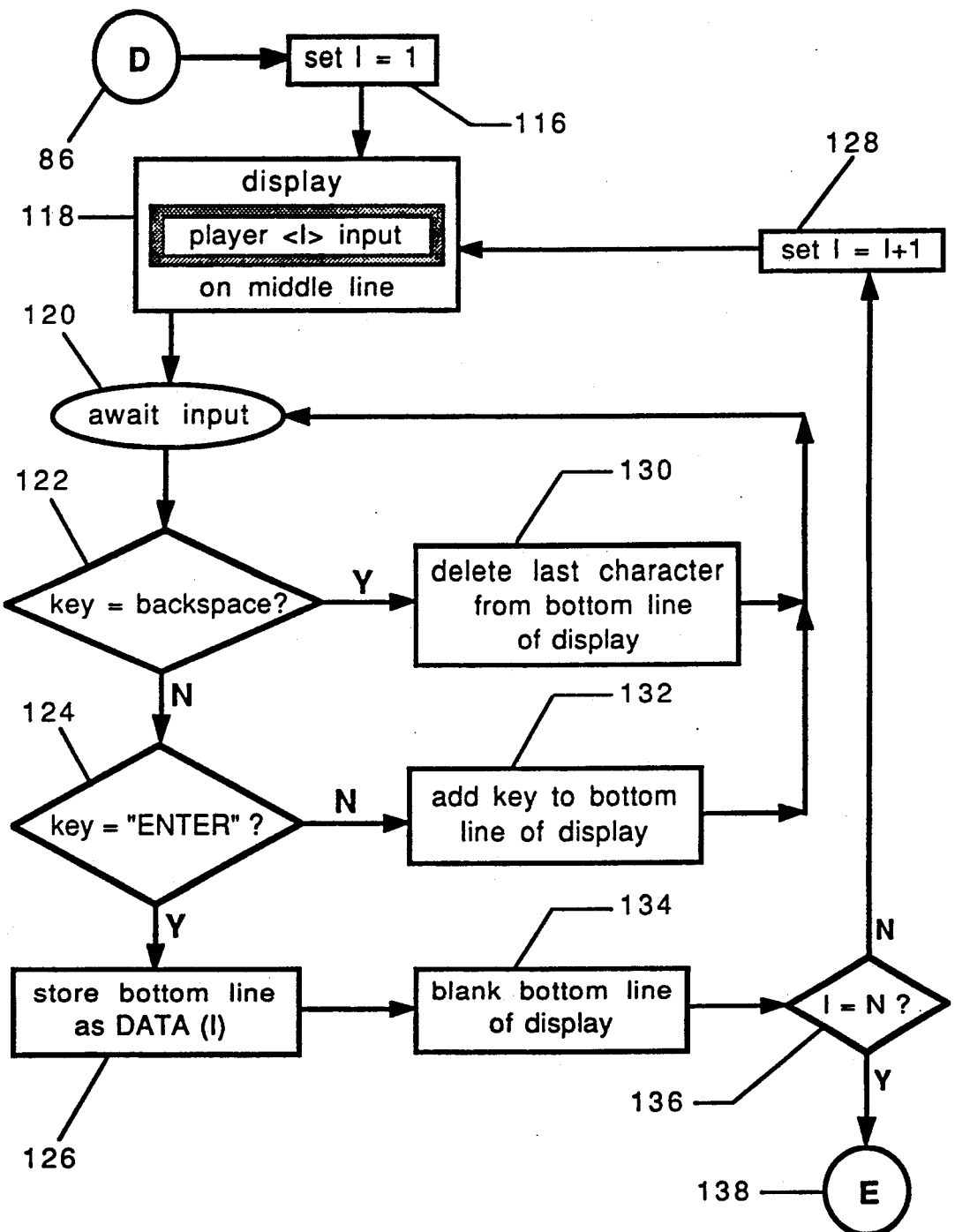

In the top half of FIG. 10 ETP is in "rank" mode, picking up at point B [84] and checking which key has been pressed [100]. Depending on whether the key was 1, 2 or 3 respectively, it displays both mode ("rank") and output option [102], [104], [106] and proceeds to point D [86]. The bottom half is in "vote" mode, picking up at point C [98], checking the key again [108] and displaying mode and output option [110], [112], [114] according to which key is pressed. It proceeds also to point D [86].

At point D [86] in FIG. 11, the flows have again unified. ETP sets an index I to 1 [116] in order to loop through the player inputs. Each time a new player is to input, ETP calls specifically [118] for that input and waits [120] for a key to be pressed. If the backspace key is used [122] it deletes the last character input by that player [130] (nothing happens if no character has yet been typed in). Until the ENTER key is pressed [124] successive characters are added [132] to the bottom of the display; note that in the meantime, the mode, output option and player number continue to be displayed so that no player may be misled about what will become of his information. After ENTER is pressed the player's input, now indicated on the bottom line of the display, is stored [126] in Random Access Memory and then that bottom line is immediately blanked [134], leaving the input information unrecoverable by any player. Now the index is checked [136] and if it has not yet reached N, it is incremented [128] and the next player's input is requested [118]. Otherwise the input phase is complete and the program proceeds to point E [138].

Figure 12:
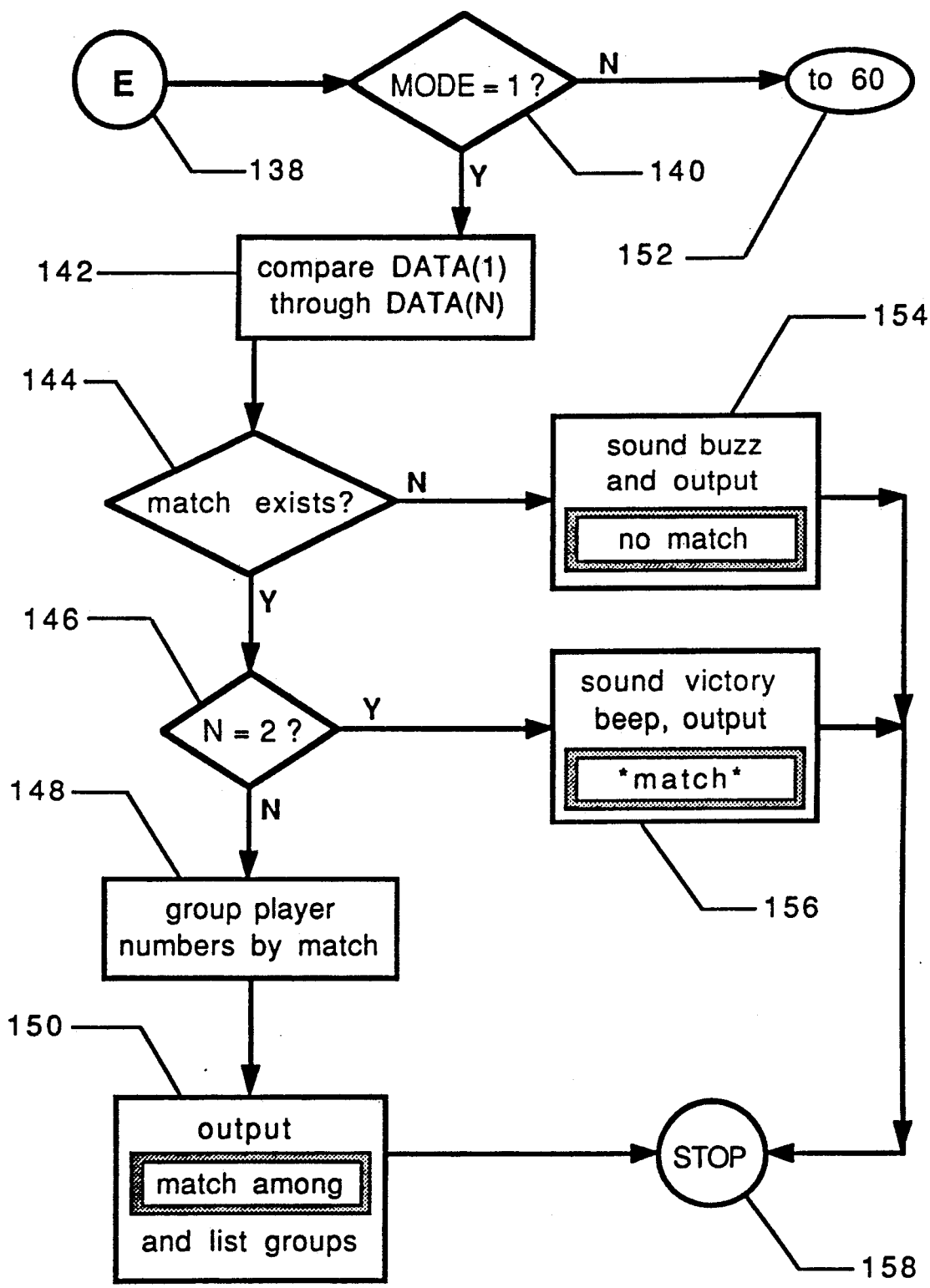

At the top of FIG. 12, the program arrives at point E [138] and checks [140] to see if it is in "match" mode. If not, it proceeds to point F [152]; otherwise it compares the N pieces of input data [142]. If no two are identical [144] it sounds a buzzer [154] and reports "no match." If there is a match and only two players are participating [146], it sounds the Morse code for "V" and reports the match [156]. If there are more than two players it must be more specific; it groups the players according to input [148] and reports matches among those groups [150]. For example, if players 1,4 and 6 all input the word "ALWAYS", players 3 and 5 input "SOMETIMES" and player 2 input "NEVER", ETP will report "match among players {1,4,6} and {3,5}". In any case the program now STOPS [158].

Figure 13:
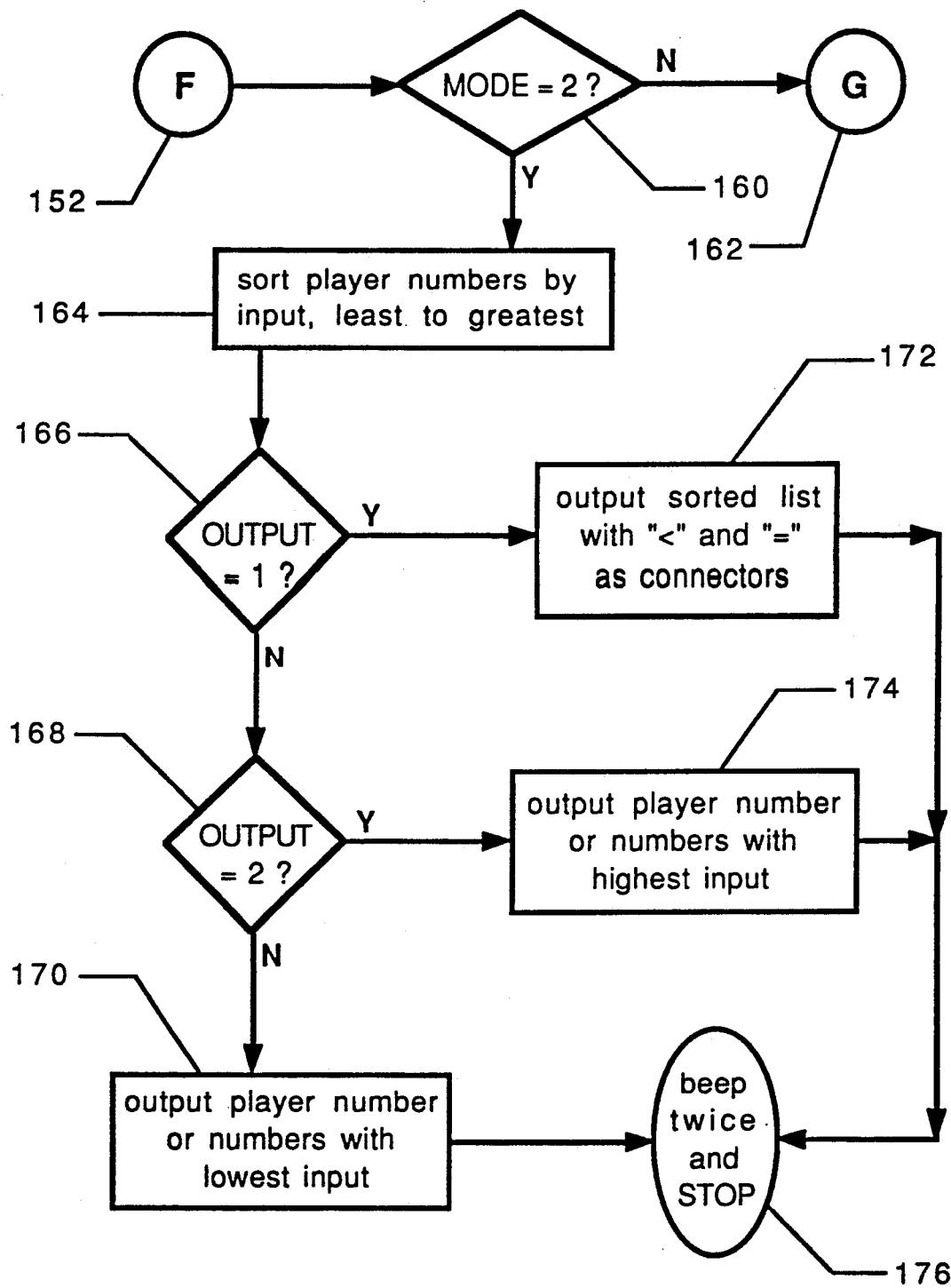

At the top of FIG. 13 the program picks up at point F [152], having found that it is not in "match" mode. It now tests [160] to see if it is in "rank" mode, and if not proceeds to point G [162]. If it is in "rank" mode it forms a list of the player numbers sorted by input values [164] from smallest to largest, keeping track of ties. If the "full ranking" output option [166] has been selected it simply outputs the list with appropriate connectors

[172]. For example, if players 1 and 3 input the value "76" and player 2 inputs "78.5", ETP outputs the string "1=3<2". If the "highest only" option has been selected [168] it lists the player or players with highest input value [174]; otherwise it does the same [170] for the lowest value. Finally it beeps twice and STOPS [176].

Figure 14:
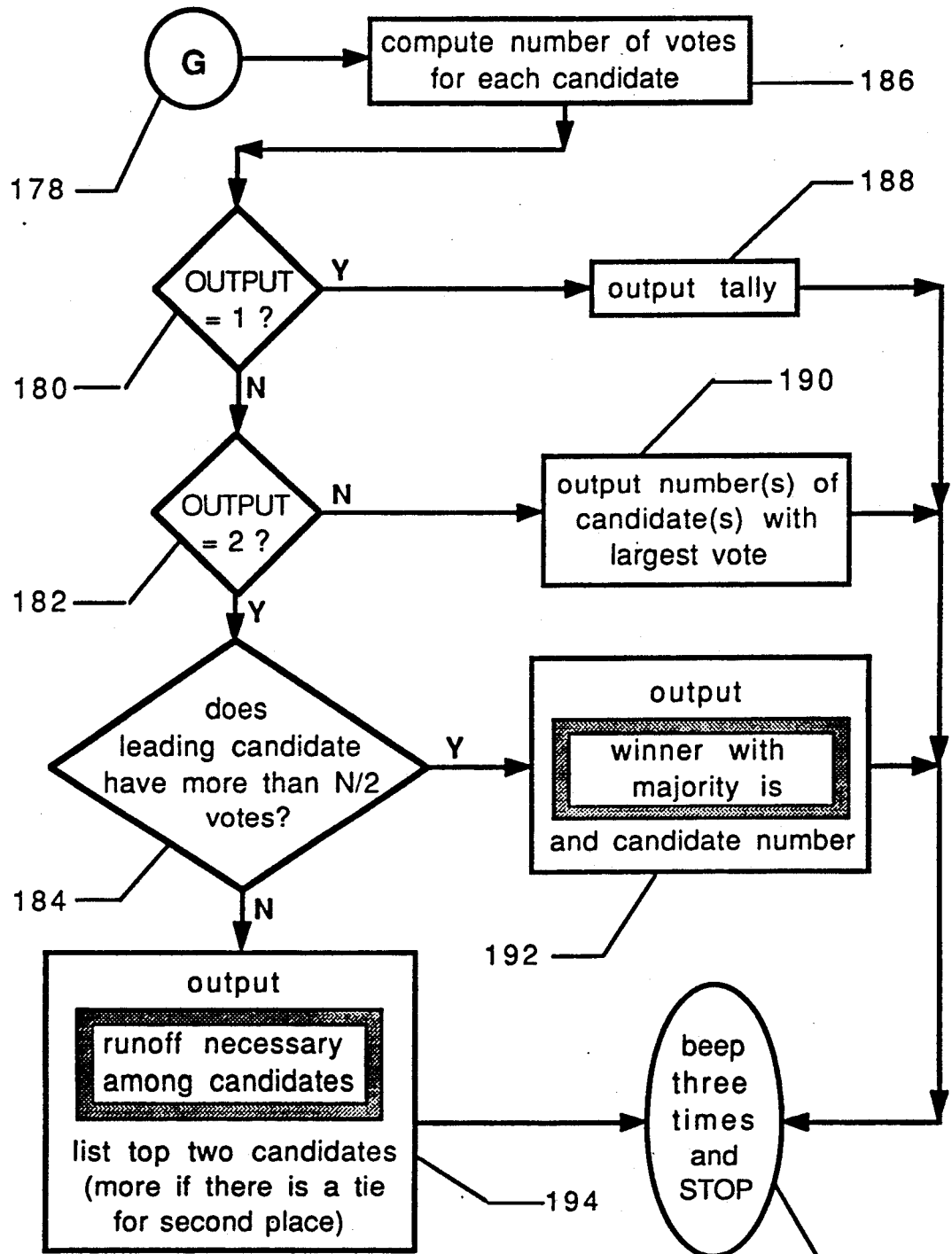

If the program survives to FIG. 14 it enters at point G [178] in "vote" mode. Here it tallies the votes [186] and if the "full tally" option has been selected [180] it outputs the tally in table format [188]. It then checks [182] for the "win/runoff" option; if it is not operative then only the winner or winners are displayed [190]. Otherwise, it checks to see if the leading candidate has more than half the vote [184] and if so names him/her as the majority winner [192]. If there is no majority, the top two candidates are listed (in no particular order) as requiring a runoff [192]. (Should there be two or more candidates tied for second place, or three or more tied for first place, all those candidates are listed.) Finally ETP beeps three times and STOPS [196].

This completes the description of ETP's flow chart.

The following listing is for a working program on the HP-28S calculator. The HP-28S is a powerful programmable device, indeed much more powerful than necessary for this program; it was chosen for its convenient size and its alphabetic keyboard.

The program duplicates the algorithm of the flowchart, enabling the HP-28S to simulate an Electronic Trusted Party for experimental purposes. As mentioned above, no multi-purpose device, in particular no programmable calculator, can actually be used as an ETP since it cannot be relied upon to destroy data. However, the following program demonstrates the ease with which ETP can ultimately be implemented.

Electronic Trusted Party: Simulation Program for HP-28S

```
<< "Enter desired mode" 1 DISP

" 1 = match" 2 DISP

" 2 = rank" 3 DISP

" 3 = vote" 4 DISP

1 CF

DO DO UNTIL KEY END DUP

IF "2" SAME

THEN "Enter desired output" 1 DISP

" 1 = full ranking" 2 DISP

" 2 = highest only" 3 DISP

" 3 = lowest only" 4 DISP

DROP DO UNTIL KEY END DUP

IF "1" SAME

THEN DROP 2 'M' STO

"Rank mode, full ranking" 1 DISP

ELSE

IF "2" SAME

THEN 1 'M' STO
```

"Rank mode, highest only" 1 DISP

ELSE 0 'M' STO

"Rank mode, lowest only" 1 DISP

END

END

ELSE DUP

IF "3" SAME

THEN "Enter desired output" 1 DISP

" 1 = full tally" 2 DISP

" 2 = winner or runoff" 3 DISP

" 3 = winner(s) only" 4 DISP

DROP DO UNTIL KEY END DUP

IF "1" SAME

THEN DROP 4 'M' STO

"Vote mode, full tally" 1 DISP

ELSE

IF "2" SAME

THEN 5 'M' STO

"Vote mode, win/runoff" 1 DISP

ELSE 6 'M' STO

"Vote mode, winner only" 1 DISP

END

END

ELSE

IF "1" SAME

THEN 3 'M' STO "Mode = *match*" 1 DISP

ELSE 1 SF

END

```
           END

END

UNTIL 1 FC?C

END "Input # of players" 2 DISP "" 4 DISP "[2 thru 9]" 3 DISP DO UNTIL KEY

END STR-> 'N' STO || 1 N

FOR i "player #" i ->STR + " input" + 2 DISP

"then press ENTER" 3 DISP "" DUP 4 DISP

DO UNTIL KEY END DUP

WHILE "ENTER" SAME NOT

REPEAT DUP

IF "BACK" SAME

THEN DROP DUP SIZE 1 - 1 SWAP SUB

ELSE +

END DUP 4 DISP DO UNTIL KEY END DUP

END DROP +

NEXT 'L' STO CLLCD IF M 3 < THEN L LIST-> 1 N

FOR j ROLLD STR-> N

NEXT ->LIST "" 'R' STO

IF M 2 ==

THEN

1 N

FOR j 1 NEG 'Q' STO 1 N

FOR i DUP

IF i GET DUP Q >

THEN 'Q' STO i 'I' STO

ELSE DROP

END

NEXT

IF Q 1 NEG >
```

```
THEN I 1 NEG PUT R ">" = I ->STR + 'R' STO 1 N

FOR i DUP

IF i GET Q ==

THEN R "=" + 'R' STO i 1 NEG PUT

END

NEXT

END

NEXT DROP R 'I' PURGE

" Player #'s ordered" 1 DISP

"  by size of input" 2 DISP

DUP SIZE 2 SWAP SUB 4 DISP "" 3 DISP

ELSE

IF 0 M ==

THEN MAXR ->NUM 'Q' STO 1 N

FOR i DUP

IF i GET DUP Q <

THEN 'Q' STO

ELSE DROP

END

NEXT

ELSE 0 'Q' STO 1 N

FOR i DUP

IF i GET DUP Q >

THEN 'Q' STO

ELSE DROP

END

NEXT

END 1 N

FOR i DUP
```

```
      IF i GET Q ==

THEN R " " + i ->STR + 'R' STO

END

NEXT DROP "Player # or #'s with" 1 DISP

IF 0 M ==

THEN "  lowest input" 2 DISP

ELSE "  highest input" 2 DISP

END "" 3 DISP R 4 DISP

END 1300 .3 BEEP 1300 .3 BEEP 'R' PURGE 'Q' PURGE ELSE

IF M 3 >

THEN

CLLCD {} 'T' STO " " DUP 'C' STO 'V' STO L 1 9

FOR j C " " j ->STR + + 'C' STO 0 'T' STO 1 N

FOR i

IF DUP i GET j ->STR SAME

THEN 1 I + 'T' STO

END

NEXT V " " I ->STR + + 'V' STO T I + 'T' STO

NEXT DROP C 'C' PURGE T PURGE

IF 4 M ==

THEN "Candidate #" 1 DISP 2 DISP

"# of votes" 3 DISP V 4 DISP

ELSE DROP "" 'V' STO 0 'Q' STO T 1 9

FOR i DUP

IF i GET DUP Q >

THEN 'Q' STO

ELSE DROP

END

NEXT 1 9
```

```
FOR i DUP

IF i GET Q ==

THEN V " " + i ->STR + 'V' STO i 0 PUT

END

NEXT

IF M 6 ==

THEN "Winning candidate(s)" 1 DISP V 3 DISP

ELSE

IF V SIZE 2 >

THEN "Tie among candidates #" 1 DISP V 3 DISP

ELSE

IF Q Q + N >

THEN "Winner with majority is" 1 DISP

"   candidate #" V + 2 DISP

ELSE 0 'Q' STO 1 9

FOR i DUP

IF i GET DUP Q >

THEN 'Q' STO

ELSE DROP

END

NEXT 1 9

FOR i DUP

IF i GET Q ==

THEN V " " + i ->STR + 'V' STO

END

NEXT

"Runoff necessary among" 1 DISP

"   candidates #" 2 DISP
```

```
           V 4 DISP
      END
   END
      END DROP
      END 1200 .2 BEEP 1200 .2 BEEP 1200 .2 BEEP 'Q' PURGE 'T' PURGE 'C'
PURGE
   ELSE
    {} 'ML' STO 1 N 1 -
       FOR i L i GET DUP 0
          IF SAME
          THEN DROP
          ELSE i 1 ->LIST 'TL' STO i 1 + N
             FOR j DUP L j GET
                IF SAME
                THEN TL j + 'TL' STO 'L' j 0 PUT
                END
             NEXT DROP TL 1 1 ->LIST
                IF SAME
                THEN
                ELSE ML TL 1 ->LIST + 'ML' STO
                END
          END
       NEXT 'TL' PURGE {} ML
          IF SAME
          THEN 100 .5 BEEP "*no match*" 2 DISP
             "" 1 DISP "" 3 DISP "" 4 DISP
          ELSE 1323 .1 BEEP 1323 .1 BEEP 1323 .1 BEEP 1050 .5 BEEP
             IF N 2 SAME
```

```
THEN "  *match*" 2 DISP

"" 1 DISP "" 3 DISP "" 4 DISP

ELSE "*match* for players" 1 DISP

ML ->STR DUP SIZE 2 - 3 SWAP SUB 2 DISP

END

END 'ML' PURGE

END END
```

We conclude this section by taking advantage of the above listing to reiterate the point made above about unsuitability of programmable calculators to actually function as an Electronic Trusted Party.

Suppose the last line of the above program is replaced by the following:

```
'ETP' RCL->STR DUP SIZE 5 - 1 SWAP
SUB 'L' RCL->STR +
"END >>" + STR->'ETP' STO
'L' PURGE 'N' PURGE 'M' PURGE IF 0 THEN END>>
```

If the program itself has been stored by the name "ETP", this new ending will force the program to recall its own listing and hide the input data inside that listing where it can be retrieved by the programmer at a later time.

RAMIFICATIONS

While the above description contains many specificities, these should not be construed as limitations on the scope of the invention, but rather as an exemplification of one preferred embodiment thereof. Many other variations are possible, some of which are indicated below. Accordingly, the scope of the invention should be determined not by the embodiment illustrated, but by the appended claims and their legal equivalents.

To begin with, the embodiment described above is designed to be a multi-purpose Electronic Trusted Party; ETP's designed for specific purposes may be simpler, for example by not requiring mode selection. An ETP designed for use in a game might perform only matching; one designed for bidding might perform only ranking; one designed for voting might have only that function available, although perhaps with many more output options than the three given above.

Very cheap versions of ETP, still useful for amusement, need not contain such niceties as the cover-shield or shock detector; even the visual readout can be dispensed with, output being indicated only by beeps or buzzes. Input might be only alphabetic or only numeric; in some circumstances even "yes" and "no" buttons might suffice.

On the other hand, an Electronic Trusted Party designed for very serious use, such as in legal work, may be manufactured with extra safeguards against tampering or fraud. For example, each such ETP might be given a serial number and be registered with the manufacturer; further, a special secret sequence of keys, which produces a particular response, might be available to the manufacturer or the owner thereby enabling them to assure that the device is not a counterfeit. Also, the case of such a device could be made of metal and permanently welded, making access for tampering as difficult as possible.

Further possible features include a variable time-limit, which will cause the device to blank its memory automatically if it has not received an expected input for too long a time; and a spell-checker to warn the users when a spelling error might have prevented a match from occurring. Special-purpose ETP's might make use of their visual readouts to pose questions to the user, for example in cases of authentication.

Finally, ETP's can be made with more than one keyboard, so that two or more persons may enter their data simultaneously or at distant locations. For example, an ETP could be built into the top of a conference desk so that individuals could record votes or opinions on the keypad in front of him or her, with output displayed in the center. Two ETP's could even be designed to "talk" to one another over a telephone line, or by directly plugging one into the other; it is easy to design a protocol by which they may discern whether two inputs match, without either passing its information to the other when they don't.

However, the embodiment described in the illustrations remains our favorite on account of the ease with which it can be built and operated, and the many uses to which it can be put.

CONCLUSION

We have shown that the Electronic Trusted Party is a useful or even essential device whenever two or more persons wish to pool their information without revealing it. Though no more difficult to build or operate than a typical four-function calculator, it performs services that no other device, either dedicated or multi-purpose, can perform. We have suggested uses for the Electronic Trusted Party in password exchange, gossiping, secret ballot voting, boardroom polling, bidding, secret comparison, overcoming shyness, police interrogation and adult games; doubtless more will be found.

The Electronic Trusted Party will be a unique and valued product. Although it is only through today's microprocessor technology that such a device can be cheaply made, needs for it have existed throughout history and will continue to exist as long as there are people—and machines—that can't be trusted to keep their mouths shut.

I claim:

1. A device for comparing information in such a way that no person can recover the information input by another person, comprising:
   a means for input of information by a multiplicity of persons;
   a means for comparing said information, then destroying said information, so that said information is rendered unrecoverable from said device; and
   a means for output of the results of said comparison, whereby each of said persons is assured that his or her information can not be obtained by one of the other persons unless said other person is already in possession of said information.

2. The device of claim 1 wherein said means for input comprises a manual keyboard.

3. The device of claim 1 wherein said means for comparing said information comprises an electronic processor.

4. The device of claim 1 wherein said means for output comprises an electrically driven visual display.

5. The device of claim 1 wherein said means for output comprises an electrically driven means for producing sound.

6. A portable electronic device for comparing information in such a way that no person can recover the information input by another person, comprising:
   a means for input of information by a multiplicity of persons;
   a means for comparing said information, then destroying said information, so that said information is rendered unrecoverable from said device; and
   a means for output of the results of said comparison, whereby each of said persons is assured that his or her information can not be obtained by one of the other persons unless said other person is already in possession of said information.

7. The device of claim 6 wherein said means for input comprises a manual keyboard.

8. The device of claim 6 wherein said means for comparing said information comprises a microprocessor and electric battery.

9. The device of claim 6 wherein said means for output comprises an electrically driven visual display.

10. The device of claim 6 wherein said means for output comprises an electrically driven means for producing sound.

11. A portable electronic device for comparing in such a way that no person can recover the information input by another person, comprising:
    a means for input of information by a multiplicity of persons;
    a means for comparison of said information;
    a means for destruction of said information, so that said information is rendered unrecoverable from said device; and
    a means for output of the results of said comparison.

12. The device of claim 11 wherein said means for input comprises a manual keyboard.

13. The device of claim 11 wherein said means for comparing said information comprises a microprocessor, and said comparison entails determining which of said multiplicity of persons have input the same information into said device.

14. The device of claim 11 wherein said means for comparing said information comprises a microprocessor, and said comparison entails determining which of said multiplicity of persons have input the largest numerical value into said device.

15. The device of claim 11 wherein said means for comparing said information comprises an electronic processor, and said comparison entails determining the winner or winners of an election, the votes for said election having been input to said device by said multiplicity of persons.

16. The device of claim 11 wherein said means for output comprises an electrically driven visual display.

17. The device of claim 11 wherein said means for output comprises an electrically driven means for producing sound.

* * * * *